US011716022B2

(12) United States Patent
Tarroboiro et al.

(10) Patent No.: US 11,716,022 B2
(45) Date of Patent: Aug. 1, 2023

(54) HYBRID BUCK-BOOST POWER CONVERTER WITH EMBEDDED CHARGE PUMP

(71) Applicant: Apple Inc., Cupertino, CA (US)

(72) Inventors: Giovanni Tarroboiro, Bientina (IT); Pietro Gabriele Gambetta, Leghorn (IT)

(73) Assignee: Apple Inc., Cupertino, CA (US)

( * ) Notice: Subject to any disclaimer, the term of this patent is extended or adjusted under 35 U.S.C. 154(b) by 106 days.

(21) Appl. No.: 17/203,577

(22) Filed: Mar. 16, 2021

(65) Prior Publication Data

US 2022/0302827 A1     Sep. 22, 2022

(51) Int. Cl.
*H02M 3/158* (2006.01)
*H02M 1/00* (2006.01)
*H02M 3/07* (2006.01)

(52) U.S. Cl.
CPC .......... *H02M 3/158* (2013.01); *H02M 1/0095* (2021.05); *H02M 3/07* (2013.01)

(58) Field of Classification Search
CPC .. H02M 1/0095; H02M 3/1582; H02M 3/158; H02M 3/07
See application file for complete search history.

(56) References Cited

U.S. PATENT DOCUMENTS

| | | | |
|---|---|---|---|
| 3,000,117 A1 | 8/2011 | Petricek | |
| 8,000,117 B2 * | 8/2011 | Petricek | H02M 3/1582 363/60 |
| 9,178,427 B1 * | 11/2015 | Szolusha | H05B 45/375 |
| 9,496,799 B2 | 11/2016 | Goetz et al. | |
| 9,748,841 B2 * | 8/2017 | Granato | H02M 7/4837 |
| 9,893,684 B2 | 2/2018 | Lehtola | |
| 10,868,429 B2 | 12/2020 | Li et al. | |
| 2017/0117717 A1 * | 4/2017 | Pagano | H02J 50/10 |
| 2018/0041125 A1 * | 2/2018 | Vinciarelli | H02M 3/158 |
| 2018/0367033 A1 * | 12/2018 | Kotikalapoodi | H02M 1/14 |
| 2020/0218301 A1 * | 7/2020 | Lidsky | H02M 3/158 |
| 2021/0351719 A1 * | 11/2021 | Chuang | H02M 3/158 |
| 2022/0131461 A1 * | 4/2022 | Huang | H02M 1/36 |
| 2022/0224231 A1 * | 7/2022 | Rizzolatti | H02M 1/0095 |
| 2022/0231618 A1 * | 7/2022 | Yan | H02M 3/1582 |

* cited by examiner

*Primary Examiner* — Gustavo A Rosario-Benitez
(74) *Attorney, Agent, or Firm* — Kowert, Hood, Munyon, Rankin & Goetzel, P.C.; Erik A. Heter; Dean M. Munyon

(57) ABSTRACT

A power converter is disclosed. The power converter includes a switching circuit coupled to a capacitor and further coupled to a regulated power supply node via an inductor. The switching circuit is configured to magnetize the inductor, using the capacitor, in response to activation of a first control signal, and further configured to charge the capacitor, using an input power supply, in response to activation of a second control signal. A control circuit is configured to activate the first control signal based on a comparison of a first threshold value and a current flowing in the inductor. The control circuit is further configured to activate the second control signal based on a comparison of a second threshold value and the current flowing in the inductor.

20 Claims, 10 Drawing Sheets

HYBRID BUCK-BOOST POWER CONVERTER WITH EMBEDDED CHARGE PUMP

BACKGROUND

Technical Field

This disclosure is directed to power converters, and more particularly, to switching power converters.

Description of the Related Art

Switching power converters are well known in the electronic arts. Switching power converters include buck converters, in which the output voltage is less than the input voltage, and boost converters, in which the output voltage is greater than the input voltage. Such switching converters may trade voltage and current in the buck or boost operation, and may provide greater efficiency than linear voltage regulators.

Some switching converters includes a pair of switches (e.g., transistors). One of the switches, when closed, couples an energy storage element (e.g., an inductor) to an input voltage source at a node sometimes referred to as a switch node. Another switch couples the switch node to a ground or reference node. The two switches operate on opposite phases, and thus the status of the switch node alternates between charging and discharging the energy storage element. The voltage across the energy storage element is averaged out (although some ripple may be present) and provided as a regulated DC supply voltage to a load circuit.

SUMMARY

A power converter is disclosed. In one embodiment, the power converter includes a switching circuit coupled to a capacitor and further coupled to a regulated power supply node via an inductor. The switching circuit is configured to magnetize the inductor, using the capacitor, in response to activation of a first control signal. The switching circuit is further configured to charge the capacitor, using an input power supply, in response to activation of a second control signal. The power converter further includes a control circuit configured to activate the first control signal based on a comparison of a first threshold value and a current flowing in the inductor. The control circuit is further configured to activate the second control signal based on a comparison of a second threshold value and the current flowing in the inductor.

In various embodiments, the power converter of the present disclosure may operate as either a buck converter or a boost converter, depending on the switching configuration. When operating as a boost converter, the capacitor may be used as a charge pump to raise the input voltage on a local voltage node. Thereafter, the capacitor may be used to magnetize the inductor during a first cycle in which the first control signal is asserted. During a second cycle, the capacitor may charge while the inductor is demagnetized.

BRIEF DESCRIPTION OF THE DRAWINGS

The following detailed description makes reference to the accompanying drawings, which are now briefly described.

DETAILED DESCRIPTION OF EMBODIMENTS

Figure 1:
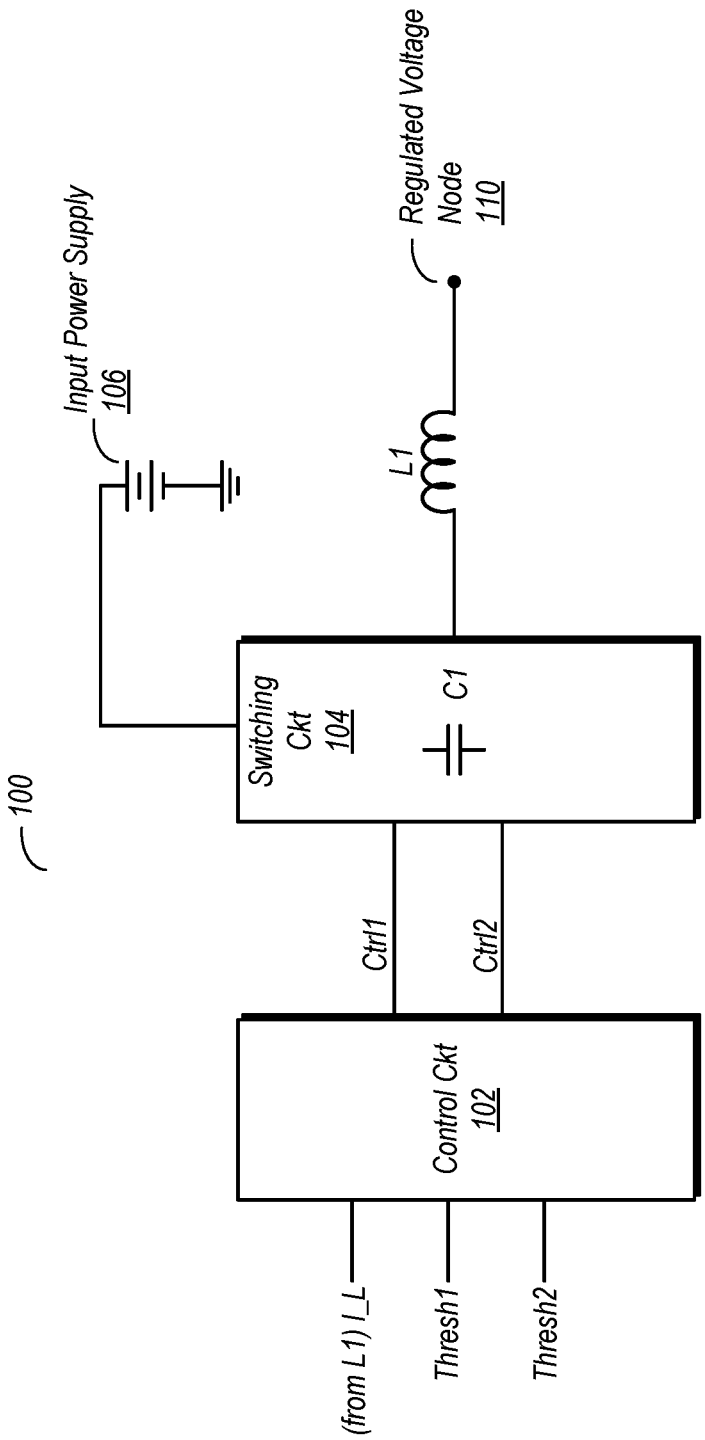
FIG. 1 is a block diagram of one embodiment of a power converter.

The present disclosure is directed to various embodiments of a power converter that includes an embedded charge pump and that may be operated as a boost converter or a buck converter. Certain types of known power converters are limited in transient performance due to the right-half plane zero limitation (RHPZ). In a boost converter RHPZ results from a zero in the transfer function that occurs in the right-half plane (e.g., the zero has a positive value). In the control loop of a boost converter, the RHPZ can cause the boost regulator to observe a drop in the output voltage even when duty cycle is increased, thereby causing the circuit to respond in a manner opposite of the polarity of the control system. This zero may limit the achievable bandwidth in boost converters. Due to the RHPZ limitation, a controller of a power converter may overreact to changes in the system state, and if operating fast enough, can be subject to oscillation. One common method for dealing with this limitation is to slow down the controller response. However, this can limit achievable bandwidth of the controller, and can adversely affect transient performance.

Many power converters may utilize PID (proportional-integral-derivative) controllers, which respond not only to the present state of the system (proportional) but to the past state (integral) and a prediction of the future state (derivative) based on rates of change of the output. These controllers may provide desired phase margin and DC gain to in order to meet stability and static load performance objectives. In power converters arranged to supply multiple circuits each having local decoupling capacitors, the loop phase margin may be degraded by a low frequency pole-zero combination resulting from the integral and derivative control and the load capacitance on the output.

In various embodiments of the power converter disclosed herein, circuit structures including a capacitor (which may be external but connected to other components in the circuit) that implements a charge pump in the power stage to generate a higher voltage relative to the input voltage. The voltage generated by the capacitor can be used to magnetize an inductor of the power converter. The structure disclosed herein may eliminate the RHPZ limitation, thereby allowing loop bandwidth to be extended and better transient performance to be achieved. This structure may also reduce the amount of local capacitance needed for the various load circuits without compromising stability. In addition, various embodiments of the power converter disclosed herein may be controlled using proportional control in lieu of full PID control, thereby implementing a simpler control scheme that may be compensated directly by an output capacitor. The structure may also allow for an increase in loop gain of the error amplifier to achieve static load requirements. Furthermore, the use of proportional control (without integral or derivative control) may allow for faster transient response time.

Various embodiments of the power converter disclosed herein are implemented using a hybrid structure. This structure may enable operation as either a boost converter in a first mode, or as a buck converter in a second mode. Various embodiments of the power converter also include a bypass path that, when enabled, couple the input voltage node to the regulated supply voltage (output) node. Short-to-ground protection may also be implemented.

Embodiments of the power converter as disclosed herein are now discussed in further detail below. A discussion of a generic power converter according to the disclosure begins the description below. Thereafter, a schematic of one particular embodiment is discussed, including operation as both a boost converter and a buck converter. Embodiments with variations of the circuit topology are then discussed, followed by a description of an integrated circuit utilizing embodiments of the power converter according to this disclosure. Description of a method follows, followed by a description of an example system in which one or more instances of the power converter may be utilized.

Hybrid Power Converter with Buck and Boost Functionality:

FIG. 1 is a block diagram of one embodiment of a power converter. In the embodiment shown, power converter 100 includes a control circuit 102 and a switching circuit 104. A capacitor C1 may be coupled to or implemented within switching circuit 104. An inductor L1 is coupled between switching circuit 104 and a regulated voltage node 110 from which a regulated supply voltage is provided. Inductor L1 may, in various embodiments, be implemented as a chip inductor coupled to an integrated circuit that includes power converter 100. Alternatively, inductor L1 may be implemented using a planar coil, or other suitable structure, fabricated on the integrated circuit including power converter 100. An input power supply 106 is coupled to switching circuit 104. In one embodiment, power converter 100 may operate as a boost converter, providing a regulated supply voltage that is greater than the voltage from the input power supply when operated in a first mode, and as a buck converter when operated in a second mode. The ability to operate as either a buck converter or a boost converter may provide flexibility to implement power converter 100 in multiple different applications.

In the embodiment shown, control circuit 102 is coupled to receive a feedback signal I_L, which corresponds to the inductor current through L1. Control circuit 102 of the illustrated embodiment is also coupled to receive first and second threshold signals, Thresh1 and Thresh2, which may be used as a basis for comparison with the inductor current indicated by I_L. Embodiments are contemplated in which these threshold values are generated internally by appropriate circuitry (e.g., bandgap circuits). Although not explicitly shown, control circuit 102 may have various circuits implemented therein (e.g., analog comparators) for generating the comparison results.

Control circuit 102 in the illustrated embodiment is configured to generate control signals, including the signals Ctrl1 and Ctrl2 as shown here. These signals may be alternately activated and de-activated, with one being active while the other is inactive. In one embodiment, the first control signal, Ctrl1, may be activated based on a comparison of the first threshold value, Thresh1, and the inductor current, I_L. Activation of the first control signal may cause the inductor L1 to be magnetized, using the capacitor C1. For example, the first threshold may be a valley threshold corresponding to a minimum inductor current. Activation of the first switch may thus couple the capacitor to the inductor and thereby allow it to discharge energy into and thereby magnetize the inductor. The second control signal, Ctrl2, may be activated based on a comparison of the second threshold value, Ctrl2, to the inductor current I_L. The second threshold may be a peak threshold corresponding to a maximum inductor current. When the capacitor has discharged a sufficient amount of energy to cause the inductor current to reach the threshold, activation of the second control signal may cause the capacitor to be coupled to the input voltage source, and thus cause it to begin recharging.

The activation of the second control signal, Ctrl2 may occur concurrent with the deactivation of the first control signal, Ctrl1, thereby decoupling capacitor C1 from the inductor L1 and coupling it to the input power supply 106. Similarly, activation of the first control signal Ctrl1 may be concurrent with deactivation of the second control signal Ctrl2, thereby decoupling capacitor C1 from input power supply 106 and coupling it to the inductor L1. Accordingly, power converter 100 may cycle through a first phase in which inductor L1 is magnetized by capacitor C1, and a second phase where the capacitor C1 is charged while inductor L1 is demagnetized.

Figure 2:
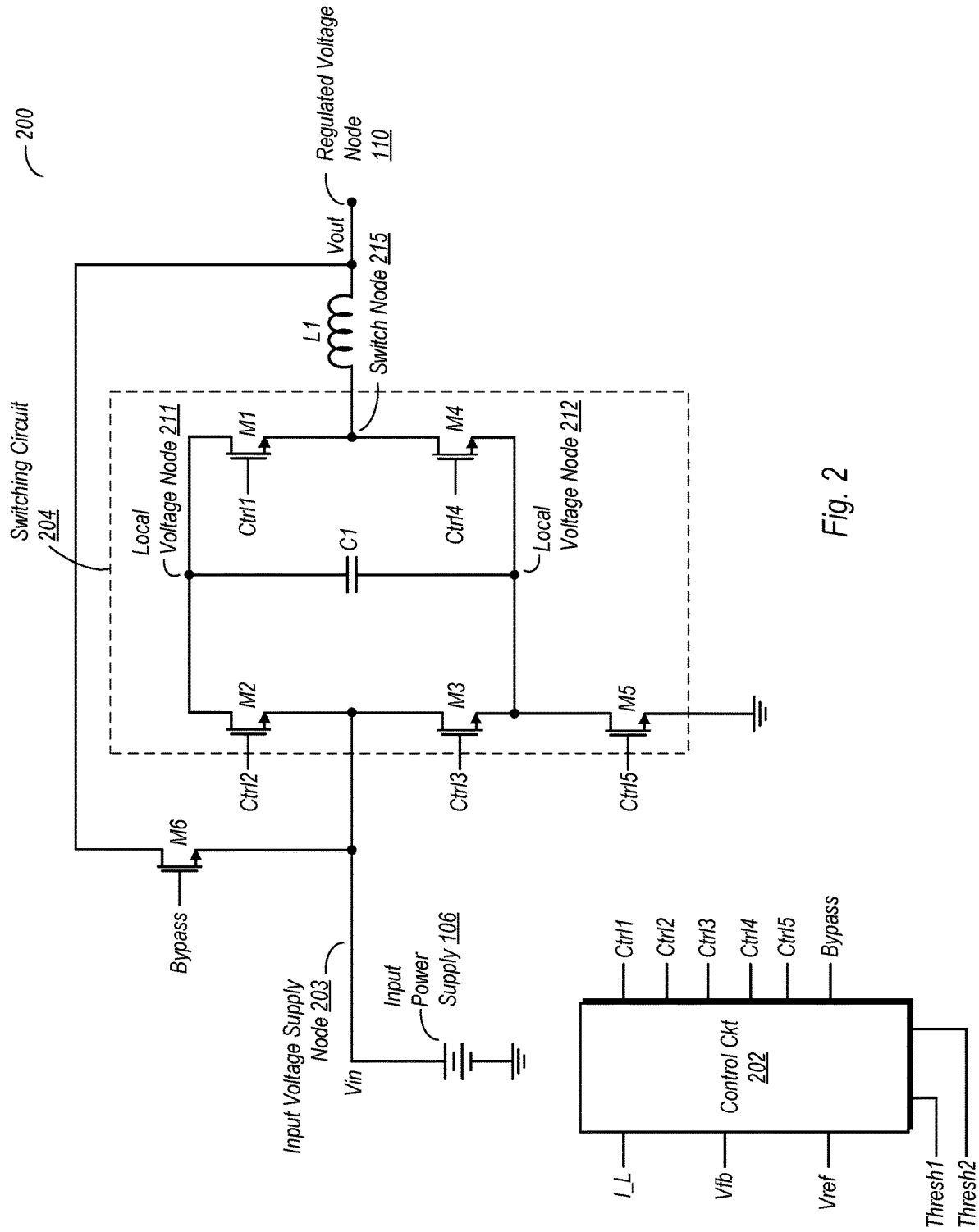
FIG. 2 is a schematic diagram of one embodiment of a power converter.

Hybrid Buck-Boost Converter with Embedded Capacitor Charge Pump:

FIG. 2 is a schematic diagram of one embodiment of a power converter 200 which may be utilized for operation as a buck converter or as a boost converter. In the embodiment shown, power converter 200 includes a control circuit 202 and a switching circuit 204. Control circuit 202 in the embodiment shown is coupled to receive a feedback signal I_L corresponding to the inductor current (through L1), as well as signals corresponding to the current threshold values, Thresh1 and Thresh2. Control circuit 202 is further configured to generate output signals Ctrl1-Ctrl5 and Bypass. Based on the states of these signals, control circuit 202 may control the operation of switching circuit 204, and thus the overall operation of power converter 200.

Switching circuit 204 in the embodiment shown includes switches that are implemented here as transistors M1-M5, which are controlled by the states of control signals Ctrl1-Ctrl5, respectively. These switches may be implemented using transistors that have a low drain-source resistance when on and are connected in a manner such that low voltage transistors can be used to implement the functionality of the circuit as described herein.

Transistors M1 and M4 are coupled to one another at a switch node 215. Transistors M2 and M3 are coupled to one another at an input voltage supply node 203, which in turn is coupled to input power supply 106. It is noted that in this embodiments, transistors M1 and M2 are implemented using NMOS transistors, although embodiments implemented with PMOS devices are possible and contemplated. In embodiments such as that shown wherein the switches of M1 and M2 are implemented using NMOS devices, these devices may be bootstrapped. Accordingly, bootstrap circuitry may be present, although it is not shown here for the sake of simplicity.

Capacitor C1 in the embodiment shown is coupled between local voltage node 211 and local voltage node 212.

This capacitor may implement a charge pump for use when power converter 200 is operating as a boost converter. In the embodiment shown, capacitor C1 may be charged by activating transistor M2 and thus coupling supply voltage node 203 to local voltage node 211. Capacitor C1 may magnetize inductor L1 when transistor M1 is activated, thereby coupling local voltage node 211 to switch node 215. In some embodiments, in which the various switches of power converter 200 are implemented on an integrated circuit, capacitor C1 may be implemented external to the same integrated circuit. However, embodiments are also possible and contemplated in which capacitor C1 is implemented on the same integrated circuit die as the various switches of power converter 200. Capacitor C1 may be implemented in various forms, such as metal-oxide-metal (MOM), metal-insulator-metal (MIM), or any other suitable capacitor structure in a semiconductor manufacturing process.

Another switch in the embodiment shown is implemented as transistor M5, which is coupled between local voltage node 212 and a ground node. This device, as will be explained below, may be activated during a phase in which, e.g., inductor L1 is demagnetized and/or capacitor C1 is charged.

Power converter 200 in the embodiment shown also includes a bypass switch, implemented here as transistor M6, which may be implemented as PMOS or other suitable device. When the Bypass signal is asserted to activate M6, input voltage supply node 203 is coupled to regulated voltage node 110. The bypass functionality implemented by a bypass switch may, among other things, aid in a smooth transition from switching activity into an idle state by allowing transistor M6 to take control of the output voltage provided on regulated voltage node 110.

The buck-like arrangement of switching circuit 204 in the embodiment shown may reduce the inductor L1 current requirements for operation in a boost mode relative to standard boost converter architectures. The current through inductor L1 may correspond directly to the load current (or a portion thereof in a multi-phase configuration), and is not amplified by a boost factor of $I_{load}/(1-D)$ as in standard boost converters (where $I_{load}$ is the load current and D is the duty cycle). This in turn may relax requirements placed on the implementation of inductor L1. Furthermore, the circuit topology of power converter 200 may offer a wide bandwidth without the RHPZ limitation, which may allow faster operation relative to standard boost converters. Output capacitor requirements may also be reduced using the circuit topology of power converter 200 relative to standard boost converters.

The circuit topology of power converter 200 also provides the flexibility to operate as a buck converter or a boost converter. Accordingly, the type of operation may be chosen depending on the particular load to be powered. The back-to-back high side path, through transistors M1 and M2, may provide isolation of the output voltage from the input voltage, and may also limit current in the event of a short-to-ground failure.

Control circuit 202 in the embodiment shown may include various types of circuitry to carry out the control functions of power converter 200. This circuitry may include comparison circuitry for performing, e.g., peak and valley current comparisons and/or determining an error between a reference voltage (Vref) and a feedback voltage (Vfb) that is based on the output voltage present on regulated voltage node 110. In the embodiment shown, control circuit 202 includes inputs for receiving various threshold signals (Thresh1 and Thresh2 in this example) which may be used for, e.g., the peak and valley current comparisons mentioned above. Control circuit 202 may also include bootstrap circuitry for implementations when certain switches (e.g., M1 and M2 in this example) are implemented as NMOS devices. The bootstrap circuitry may include an internal or external capacitor that can be recharged by other circuitry (e.g., by C1 during switching operation). In some embodiments, internal integrated capacitors may implement half-pump driver circuitry to drive certain transistors (e.g., M2 and M3). One or more error amplifiers may also be implemented in control circuit 202.

Various types of control strategies may be implemented by control circuit 202. For example, control circuit 202 may use a peak-current control strategy in one embodiment, sensing current through the coil of inductor L1 during the magnetizing phase. Current through an active device (e.g., M3) during the magnetizing phase may be compared to a peak-current threshold, using a comparator in control circuit 202, to determine when the peak current has been reached. Zero-crossing detection may also be implemented as part of the control strategy as well, e.g., by measuring current through M5 during the demagnetizing phase, sensing the sum of L1 coil current and of C1 recharge current, or even measuring directly the coil current through M4.

Generally speaking, control circuit 202 may implement any one of a number of different control strategies to control the switching of the various devices of power converter 200 as shown here, as well as in the other embodiments falling within the scope of this disclosure. These include any suitable current control mode strategy, while voltage mode control strategies are also possible and contemplated.

Furthermore, as noted above, power converter 200 may be operated as a buck converter or a boost converter. Accordingly, control circuit 202 may be arranged to cause operation in a buck converter mode or a boost converter mode. Additionally, control circuit 202 may be capable of causing a single instance of power converter 200 to switch between boost mode operation and buck mode operation.

Although power converter 200 is shown here as a single-phase converter, embodiments are possible and contemplated in which the circuitry shown is implemented in various multi-phase converter embodiments. For example, two instances of power converter 200 as shown here may be implemented and coupled to on another at a common regulated voltage node 110. Multi-phase embodiments using coupled inductor configurations are also possible and contemplated. In embodiments having multiple-phases, as well as those having couple inductors, control circuit 202 may be correspondingly configured. For example, in a multi-phase embodiment, control circuit 202 may include circuitry for determining when to add or shed phases based on, e.g., an amount of current demanded by the load.

Figure 3:
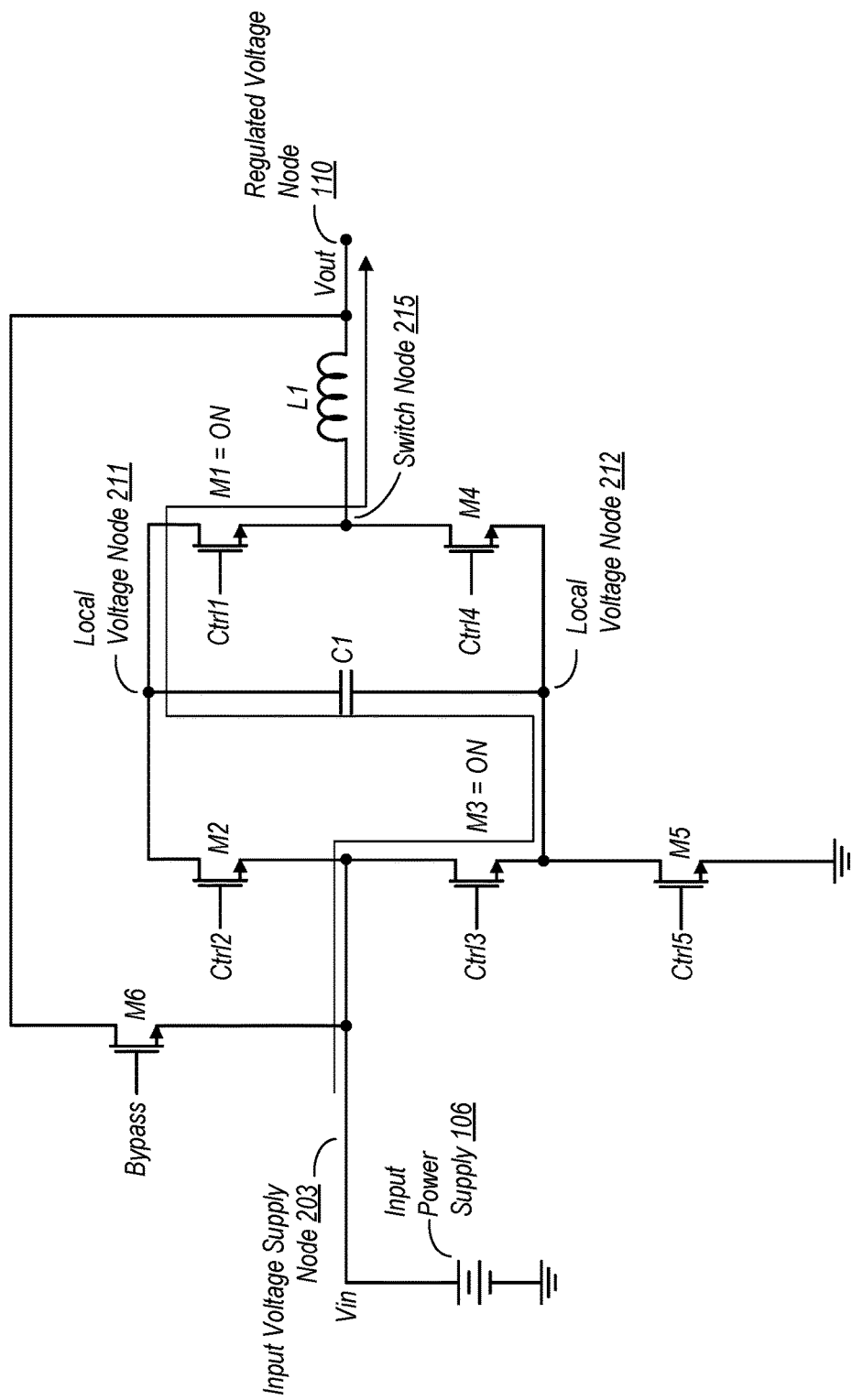
FIG. 3 is a schematic diagram illustrating operation of a one embodiment of a power converter in a boost mode.

FIG. 3 is a schematic diagram illustrating operation of the embodiment in FIG. 2 during a coil magnetizing phase. In this example, power converter 200 is operating as a boost converter, thereby providing an output voltage on the regulated voltage node 110 that is greater than the voltage provided by input power supply 106. In the coil magnetizing phase, transistors M1 and M3 are both turned on by activating control signals Ctrl1 and Ctrl3, respectively (e.g. by control circuit 202 of FIG. 2). Meanwhile, transistors M2, M4, M5, and M6 are turned off.

The operating configuration in FIG. 2 assumes capacitor C1 was previously charged. Accordingly, when M3 is turned on, local voltage node 212 is raised to a value that is approximately the same as the input voltage provided by input power supply 106. Similarly, local voltage node 211 is also raised in voltage to a value that is greater than the input voltage (e.g., two times the input voltage in one embodiment). More generally, local voltage node 211 is raised to a voltage of $V_{in}+V_{C1}$, where $V_{C1}$ is the voltage across C1 accumulated during the charging phase. With transistor M1 turned on, capacitor C1 begins discharging through inductor L1. This transfers energy to the coil of inductor L1, which is magnetized as a result, and output current is pushed to regulated voltage node 110. The current through the coil of L1, Icoil, during the magnetizing phase can be expressed as follows:

$$Icoil = \frac{(Vin + VC1 - Vout)D}{Lcoil}, \quad (Eq.\ 1)$$

where D is the duty cycle, Vin is the input voltage, Vout is the output voltage, VC1 is the voltage across capacitor C1, D is the duty cycle, and Lcoil is the inductance of L1. The amount of time the coil is magnetizing may be expressed as:

$$Tmag = D \times Ts, \quad (Eq.\ 2)$$

where Ts is the switching period.

In some embodiments, transition from the coil magnetizing phase to the capacitor recharge phase may be performed in multiple steps. In a first step, transistor M1 may be turned off while transistor M4 is turned on. In the next step, transistor M2 may be turned on, while transistor M3 is turned off, recharging cap C1 through coil current during this step (M2 and M4 on). Transition to the capacitor recharge phase may be complete when transistor M5 is turned on (e.g., the device is active with current flowing between the source and drain terminals).

Figure 4:
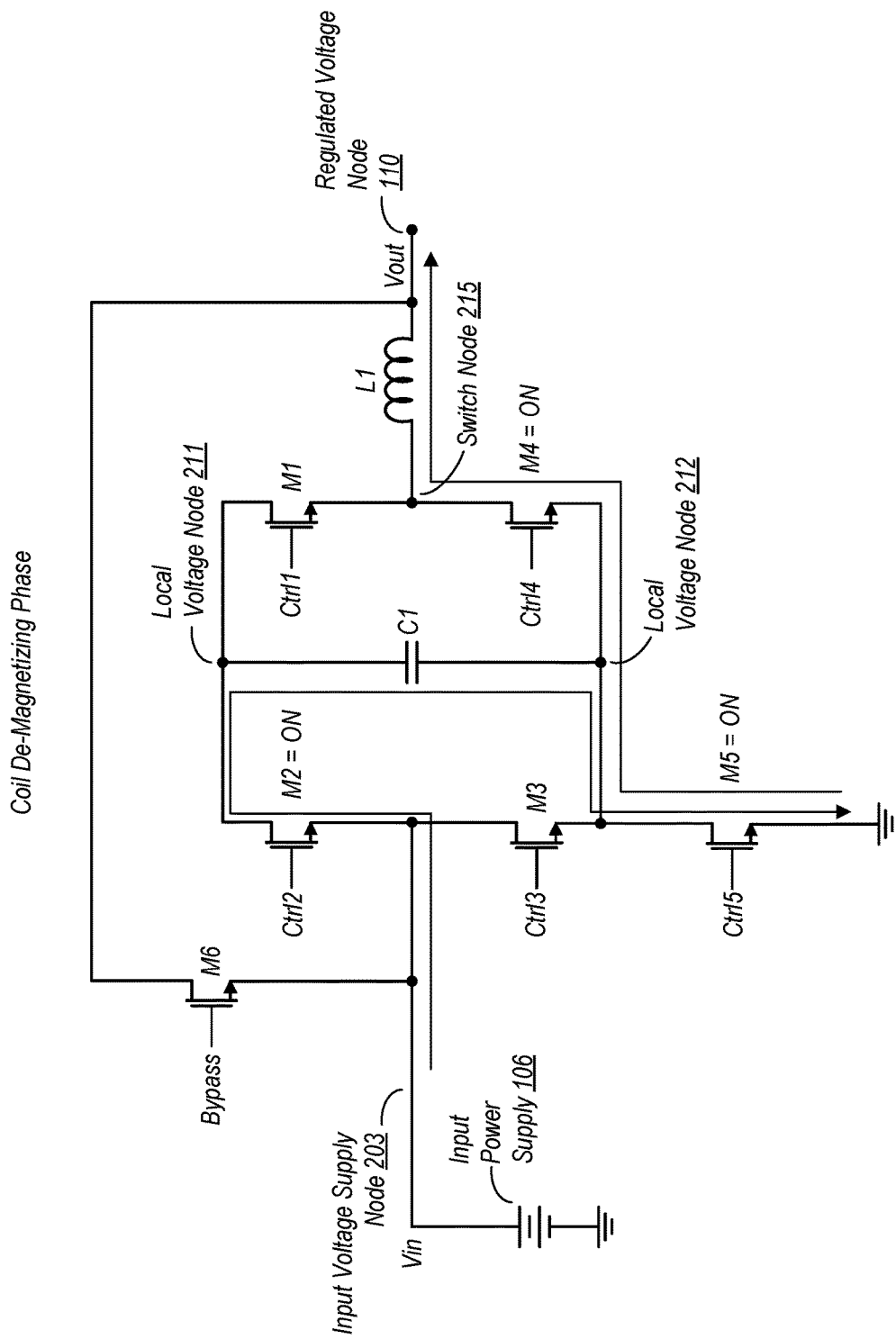
FIG. 4 is a schematic diagram further illustrating operation of one embodiment of a power converter in a boost mode.

FIG. 4 is a schematic diagram illustrating operation of the embodiment in FIG. 2 during a capacitor recharge/coil demagnetizing phase. As with FIG. 3, the example shown in FIG. 4 occurs when power converter 200 is operating as a boost converter. Control signals Ctrl2, Ctrl4, and Ctrl5 may be activated by a control circuit, and thus transistors M2, M4, and M5, respectively, are turned on. The input voltage Vin is coupled to local voltage node 211 through M2, while local voltage node 212 is coupled to ground through M5. Accordingly, capacitor C1 may be charged at this time based on the voltage Vin across its terminals.

Inductor L1 is demagnetized during this phase of operation of the illustrated embodiment. With both transistors M4 and M5 active, a path to ground exists between switch node 215 and ground. Accordingly, the magnetic field created in the inductor in the previous phase begins to collapse as it attempts to maintain current toward the load circuit (not shown here).

The current through inductor L1 during the demagnetizing phase may be expressed as follows:

$$Icoil = -\frac{Vout(1 - D)}{Lcoil}. \quad (Eq.\ 3)$$

During the capacitor recharging phase, capacitor C1 is charged such that the voltage there across is Vin. Accordingly, the duty cycle D can be expressed as:

$$D = \frac{Vout}{2Vin}. \quad (Eq.\ 4)$$

The duty cycle expression refers to an ideal case in which efficiency is at 100%, with no voltage drop through the various switches of the circuit. However, since these switches will have some resistance, the duty cycle will vary accordingly.

Switching back to the inductor magnetizing phase may occur in a manner opposite that of switching into the capacitor recharging phase. The transition may begin with the deactivation of M5. Thereafter, M3 is activated concurrent with the deactivation of M2, thereby raising the voltage level of local voltage node 212 to approximately Vin. This in turn may arise the voltage level on local voltage node 211 to approximately 2Vin. Finally, M1 is activated, thereby coupling local voltage node 211 to switch node 215, and capacitor C1 begins to discharge into L1, thereby magnetizing the latter.

As an alternative to the operation described with respect to FIGS. 3 and 4, power converter 200 may operate in three-switch boost mode in which M4 is held inactive while M1 is held active. The operation is then based on the switching of M2, M3 and M5. During a coil charging phase in which L1 is magnetized, M3 is activated (with M2 and M5 inactive), and capacitor C1 transfers energy via local voltage node 211 to switch node 215 and thus inductor L1, via M1. Meanwhile, input voltage supply node 203 is coupled to local voltage node 211 via the active M3. Accordingly, with the voltage on local voltage node 212 raised to approximately Vin, the voltage on local voltage node 211 is raised to the value of Vin plus the voltage across C1.

During a coil discharge phase in which L1 is demagnetized, M1, M2, and M5 are active. During this phase, capacitor C1 is recharged, with local voltage node 211 coupled to input voltage supply node 203, while local voltage node 212 is coupled to ground through the active M5. Accordingly, the voltage between local voltage node 211 and ground is approximately Vin at this time and capacitor C1 is charged accordingly. Meanwhile, inductor L1 is demagnetized during this phase.

The three-switch operation described above may be useful for certain operating conditions. For example, if Vout is well above Vin, the three-switch operation may be used to increase efficiency and reduce current ripple relative to the five-switch operation described above. Furthermore, control circuit 202 (not shown here) may alternate operation between the five-switch operation depicted in FIGS. 3 and 4 and the three-switch operation described in the present and immediately preceding paragraphs.

Figure 5:
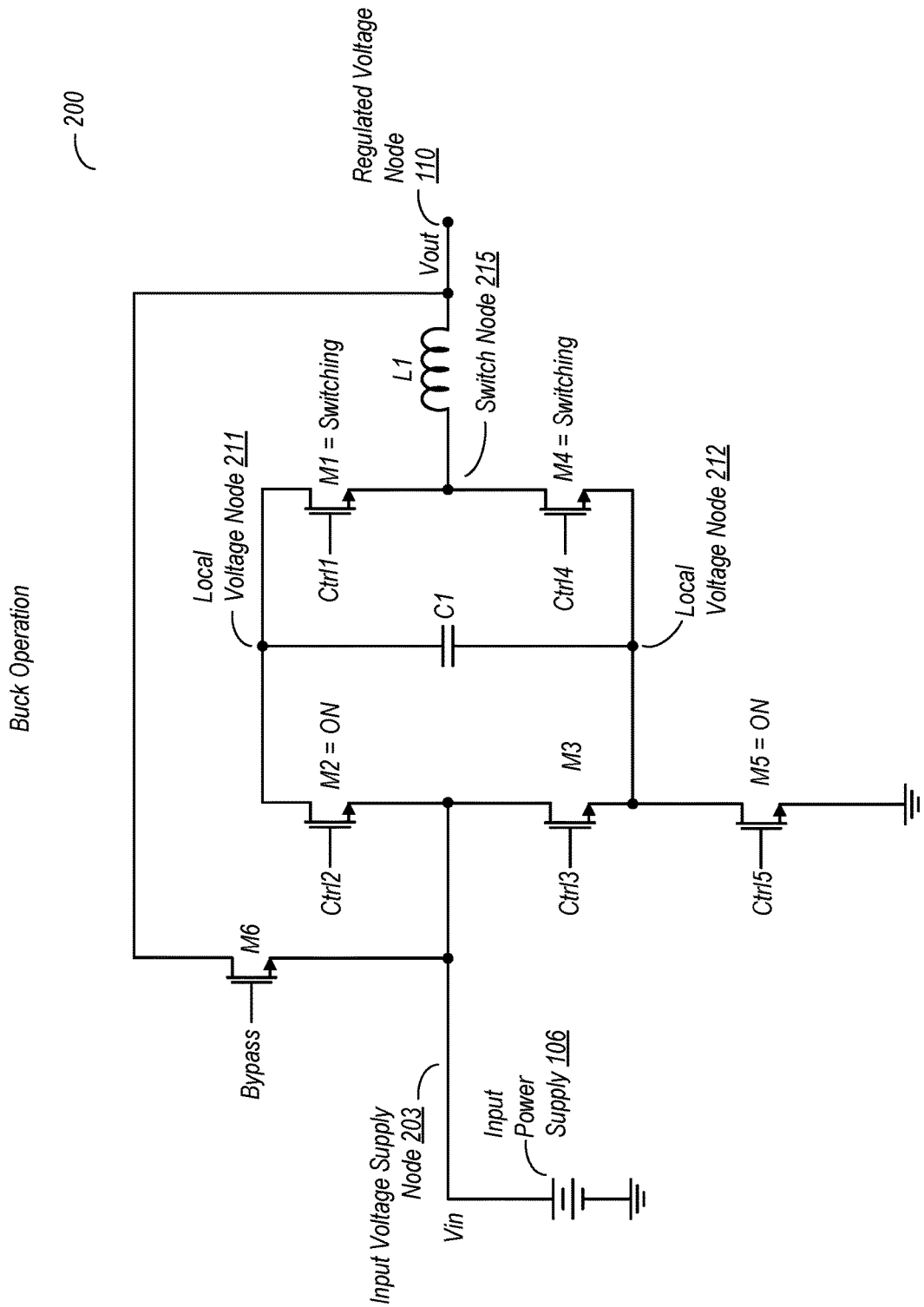
FIG. 5 is a schematic diagram illustrating operation of one embodiment of a power converter in a buck mode.

A two-switch mode of operation is also possible to realize a buck converter. FIG. 5 is a schematic diagram illustrating operation of power converter 200 as a buck converter. Operation as a buck converter using the topology of power converter 200 may be achieved by holding M2 and M5 active, M3 and M6 inactive, and alternately switching M1 (as a high side device) and M4 (as a low side device). When M1 is active, switch node 215 is effectively coupled to the input voltage, Vin, through M1 and M2. This corresponds to a coil charging phase in which inductor L1 is magnetized. When M4 is active, the switch node is effectively coupled to ground, through M4 and M5. This corresponds to a coil discharge phase in which inductor L1 is demagnetized. The duty cycle in this embodiment may be expressed as $$D = \frac{Vout}{Vin}, \quad (Eq.\ 5)$$

with Vout being less than Vin.

Power converter 200, when used as a buck converter, may be operated in a pulse frequency modulation (PFM) mode and/or a pulse width modulation (PWM) mode.

Control circuit 202 may alternate operation of power converter 200 between the various modes discussed above. Accordingly, power converter 200 may be implemented in environments in which a load circuit operates at different voltages according to operating requirements. Thus, embodiments are possible and contemplated in which a single instance of power converter 200 may be operated as a boost converter in at least one mode and a buck converter in at least one additional mode. Within a particular boost or buck mode, additional modes are possible (e.g., PFM and/PWM in a buck converter mode; three-switch and five-switch in a boost converter mode).

In addition to its versatility, the circuit topology discussed herein may allow the output voltage to be regulated smoothly for an entire range of input and output voltages, with ripple currents being well-controlled, and even in regions in which the input and output voltages are close to one another. In embodiments having the bypass functionality, a smooth transition from an operating state to an idle state may be obtainable when control of the output voltage is taken over by the bypass path. This may be achieved without the use of a high current skipping feature when the output voltage is close to the input voltage, a limitation that is often times present in other boost converters having a minimum on time.

Additional Circuit Embodiments

Figure 6:
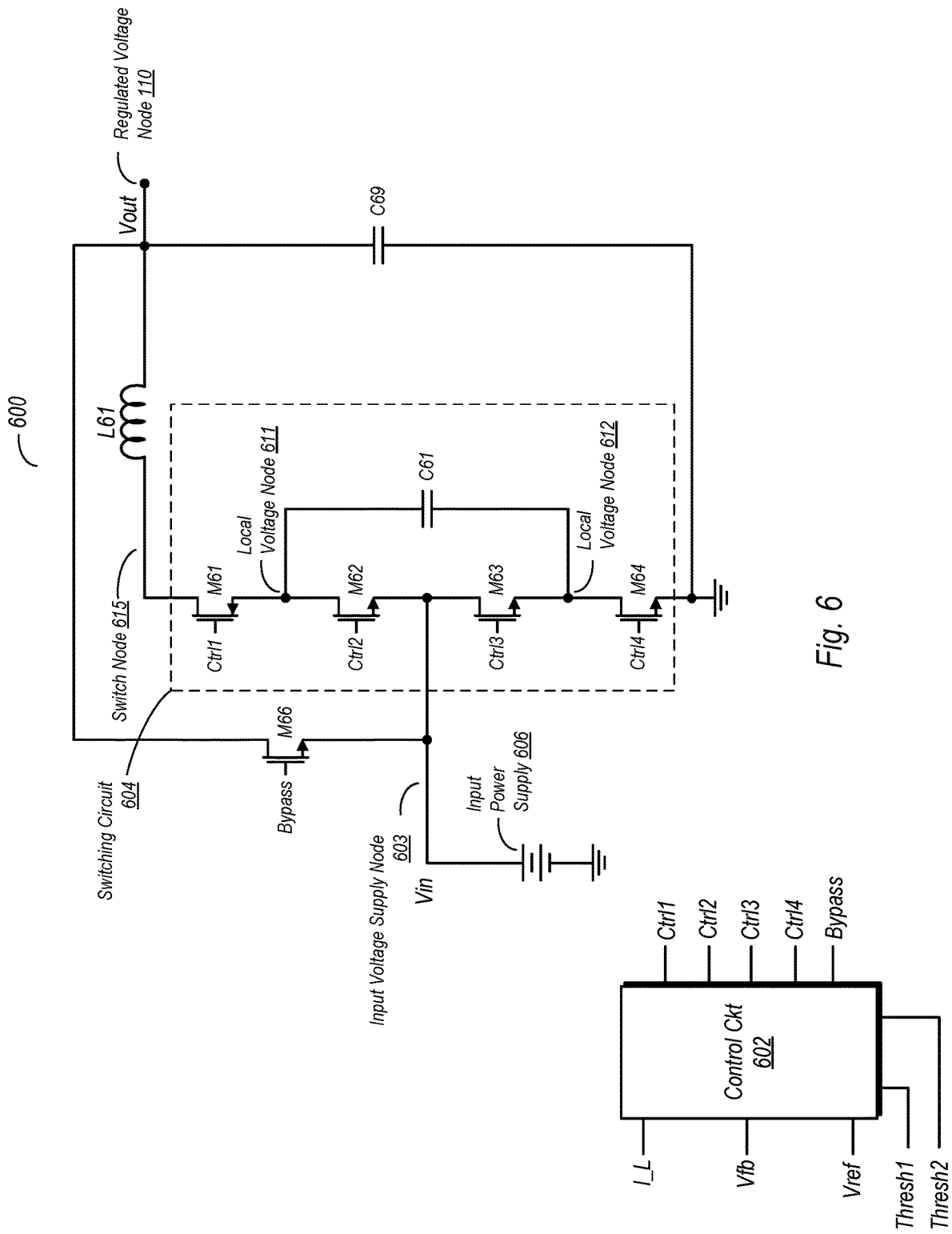
FIG. 6 is a schematic diagram of another embodiment of a power converter.

FIG. 6 is a schematic diagram of another embodiment of a power converter. In the embodiment shown, power converter 600 includes one less transistor than power converter 200 discussed above, which may result in area savings. In particular, the switch in the role of M5 in power converter 200 is no longer present in power converter 600, which is implemented with four switches and a bypass rather than the five. In the embodiment of power converter 600 shown in FIG. 6, M64 may assume the role of sustaining the output voltage in the short-to-ground case.

Power converter 600 in the embodiment shown includes switches implemented here by transistors M61, M62, M63, and M64. Transistor M61 is coupled between switch node 615 and local voltage node 611. Transistor M62 is coupled between local voltage node 611 and input voltage supply node 603. Transistor M63 is coupled between input voltage supply node 603 and local voltage node 612. An input power supply 606 is coupled to provide an input voltage, Vin, onto input voltage supply node 603. Transistor M64 is coupled between local voltage node 612 and a ground node. A capacitor C61 is coupled between local voltage node 611 and local voltage node 612. Inductor L61 is coupled between switch node 615 and regulated voltage node 110. Output capacitor C69 is coupled between regulated voltage node 110 and the ground node. Power converter 600 also includes bypass transistor M66.

Control circuit 602 in the embodiment shown is arranged to provide the various control signals to the switches shown here, and may receive signals corresponding to various thresholds (e.g., Thresh1 and Thresh2), a reference voltage (Vref), a feedback voltage (Vfb) and an inductor current (I_L). Various embodiments of control circuit 602 may include circuitry similar to control circuit 202 of FIG. 2. This may include comparators, any suitable logic circuitry, bootstrap circuitry for driving the gate terminal of certain devices, and so on.

Power converter 600 may operate as a boost converter using, e.g., using PWM control, with a PWM signal having a duty cycle D. Capacitor C61 may be charged/recharged by activating M62 and M64, placing a potential of Vin on local voltage node 611, while inductor L61 is demagnetized (e.g., at least partially through M61 if this device remains active during the recharging of the capacitor). If the potential across capacitor C61 (between local voltage nodes 611 and 612) is at Vin after recharging, activating M63 and M61 in combination with deactivation of M62 and M64 thus raises the voltage on switch node 615 to a value of approximately 2Vin. Capacitor C61 may thus discharge through, and therefore magnetize, inductor L61.

For the embodiment of power converter 600 shown in FIG. 6, the inductor current through L61 during the magnetizing phase may be express as follows:

$$Icoil = \frac{(Vin + VC1 - Vout) * D}{Lcoil}. \quad \text{(Eq. 6)}$$

During the de-magnetizing phase, the inductor current through L61 is:

$$Icoil = \frac{(Vin - Vout) * (1 - D)}{Lcoil}. \quad \text{(Eq. 7)}$$

Capacitor C61 may be charged to have a voltage there across of Vin. Accordingly, using the expressions above, the duty cycle for power converter 600 may be extracted:

$$D = \frac{Vout - Vin}{Vin}. \quad \text{(Eq. 8)}$$

and thus the output voltage, Vout, can be expressed as:

$$Vout = Vin * (1 + D). \quad \text{(Eq. 9)}$$

Power converter 600 as shown in FIG. 6 maintains the advantages of the previously discussed embodiments with regard to having a wide bandwidth control loop due to the absence of the RHPZ. Using switches having a low resistance (e.g., low drain-source resistance, rds, in the transistors), the efficiency of power converter may be comparable to other types of boost converters.

Figure 7:
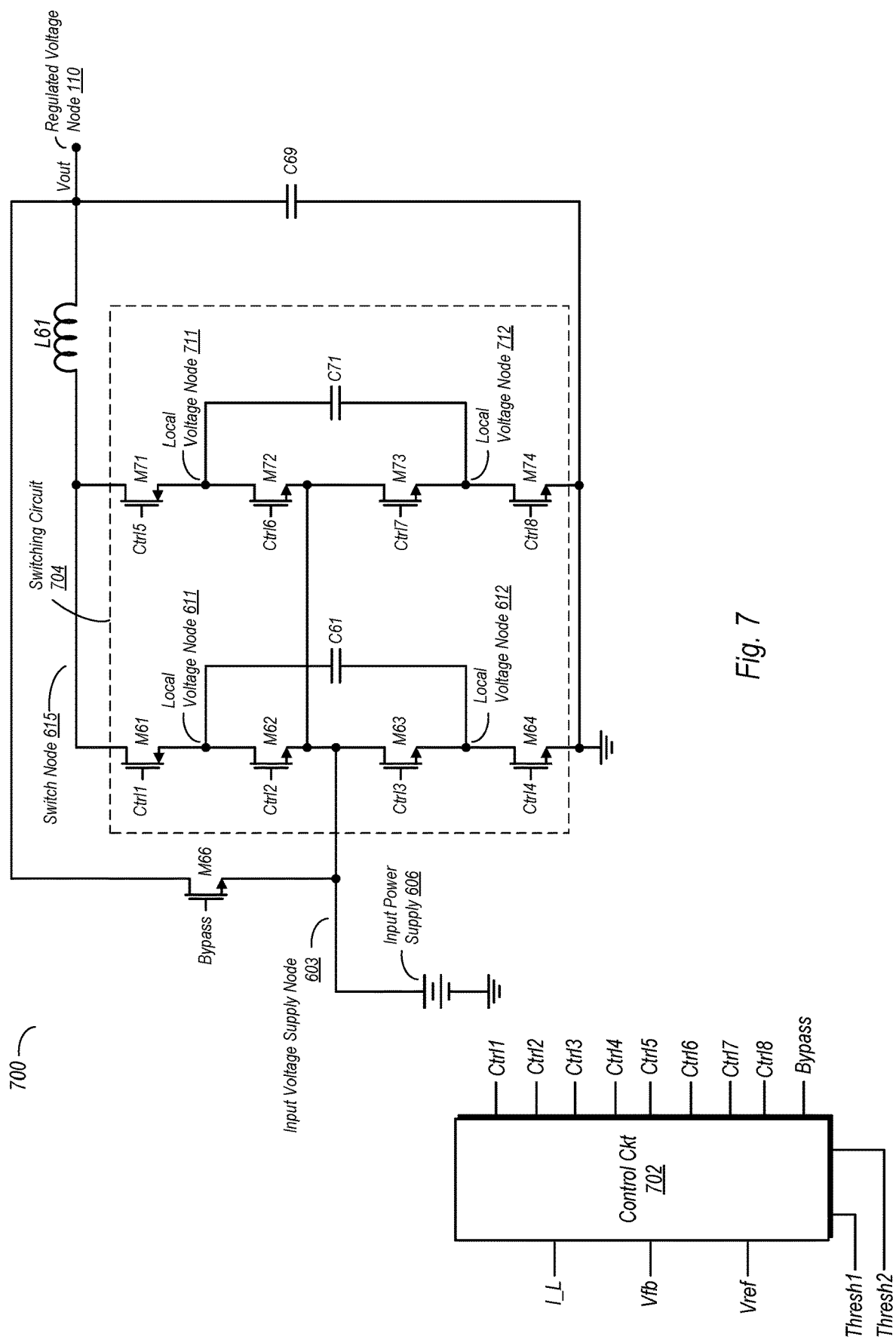
FIG. 7 is a schematic diagram of another embodiment of a power converter.

Another embodiment of a power converter is shown in FIG. 7. In the embodiment shown, power converter 700 replicates a portion of the structure of power converter 600, having a switching circuit 704 with two switch stacks and two fly capacitors. Accordingly, power converter 600 includes M61-M64 and capacitor C61 as shown in FIG. 6. Power converter 700 additionally includes switches M71-M74 and an additional capacitor C71. Switch M71 is coupled between switching node 615 and local voltage node 711, and is controlled using control signal Ctrl5. Switch M72 is coupled between local voltage node 711 and input voltage supply node 603 and is controlled using control signal Ctrl6. Switch M73 is coupled between Input voltage supply node 603 and local voltage node 712 and is controlled using control signal Ctrl7. Switch M74 is coupled between local voltage node 712 and ground and is controlled using control signal Ctrl8. Capacitor C71 is coupled between local voltage nodes 711 and 712.

Control circuit 702 in the embodiment shown is configured to generate control signals Ctrl1-Ctrl8, along with the bypass signal, and may receive the same signals as the other embodiments of a control circuit as discussed here. Additionally, control circuit 702 may include various types of circuitry such as the various other embodiments of a control circuit as discussed above.

Using the structure shown in FIG. 7, control circuit 702 may, in one embodiment, operate the two legs of power converter 700 in an interleaved manner to achieve a 100% duty cycle, with one capacitor magnetizing the coil of L61 while the other capacitor is being recharged. The sequence of operating the various switches for each individual leg of the illustrated circuit may be similar to that of the single leg shown in FIG. 6. Embodiments in which the phase of operation of the two circuit legs is varied are also possible and contemplated. Accordingly, the embodiment of power converter 700 as shown here may allow for operation with a duty cycle of up to 100%, but that may also be varied to suit the particular application if so desired.

For the various circuits discussed above in FIGS. 1-7, a peak current control scheme may be implemented with relative simplicity using an error amplifier with a finite gain that is stabilized by a smaller output capacitor. Accordingly, instead of using a full PID controller, the integral and derivative portions may be eliminated, relying only on the proportional control portion. This in turn may result in a robust design, even when a load has a large capacitance. For the various hybrid buck-boost circuits disclosed herein, this may provide an additional advantage apart from the increased transient performance. This may enable the various power converter embodiments disclosed herein to supply multiple loads in a system, even when such loads include a relatively large bypass capacitor to ground.

It is noted that while the circuits discussed above have been implemented using NMOS and PMOS transistors, the disclosure is not intended to limit embodiments falling within its scope to these types of devices. Thus, in addition to various MOSFET types discussed above, the present disclosure also contemplates embodiments that use non-planar devices such as FinFETs, GAAFETs (Gate All Around FETs), among other types. Embodiments implemented using Bipolar devices are also possible and contemplated. The disclosure further contemplates that technologies that are speculative as of this writing may be used to implement devices in various embodiments of the circuits discussed herein. These technologies include (but are not limited to) graphene transistors, carbon nanotube transistors, gallium arsenide transistors, and so on.

Integrated Circuit Embodiment

Figure 8:
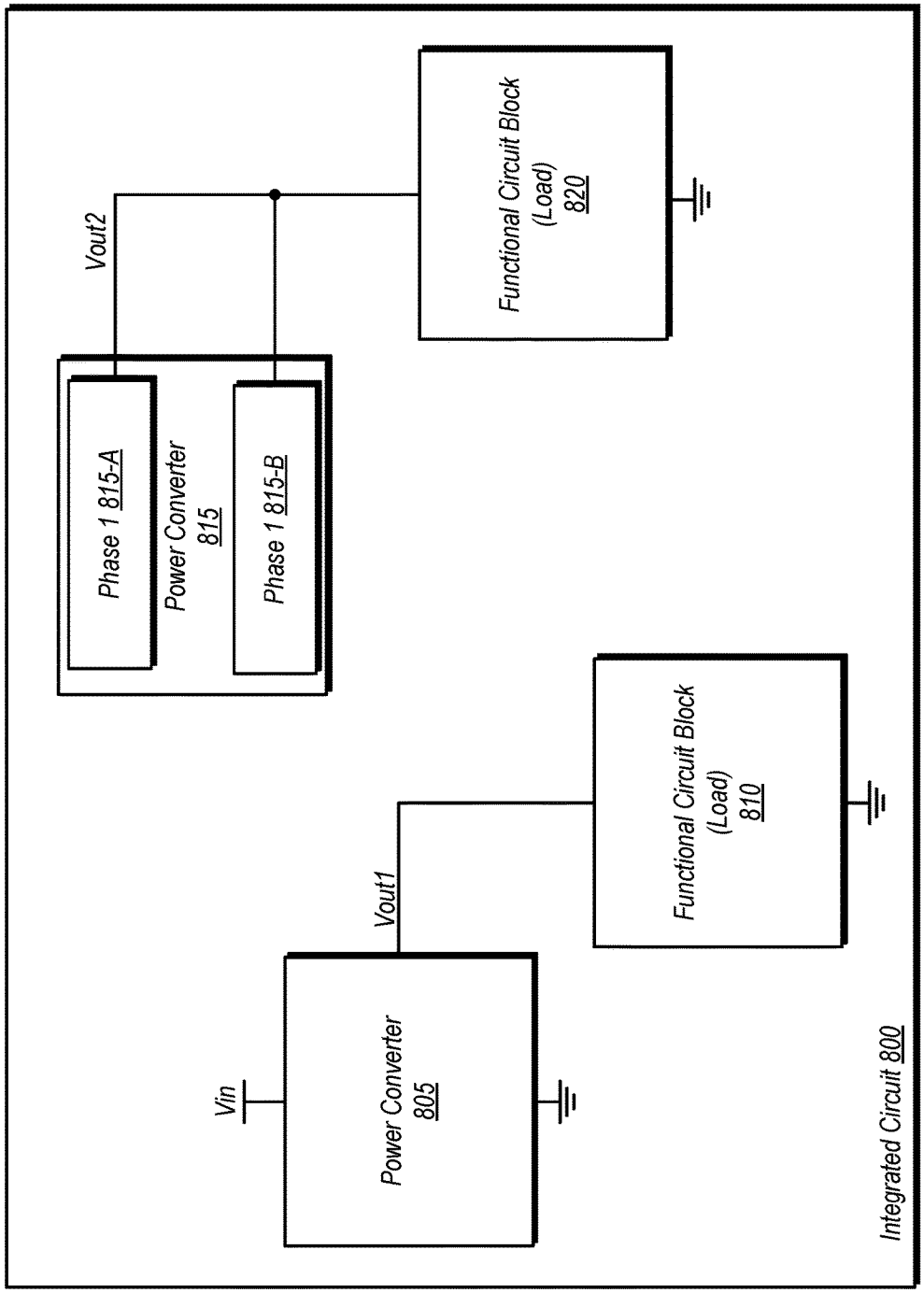
FIG. 8 is a block diagram of one embodiment of an integrated circuit.

FIG. 8 is a block diagram of one embodiment of an integrated circuit 800 including multiple instances of a power converter that utilizes circuitry according to the embodiments disclosed above. In the embodiment shown, a first power converter 805 is coupled to provide a first regulated supply voltage Vout1 to a first load, functional circuit block 810. A second power converter 815 is coupled to provide a second regulated supply voltage Vout2 to another load, functional circuit block 820. Both power converter 805 and power converter 815 may utilize various ones of the circuit topologies discussed above and falling within the scope of this disclosure.

In the embodiment shown, power converter 805 may be a single-phase converter, implementing a single instance of one of the power converter embodiments falling within the scope of this disclosure. Power converter 815 on the other hand is a multi-phase converter, having multiple instances (phase 815-A and 815-B) of the various power converter embodiments driving the regulated voltage supply node Vout2. While the two different phases shown in this embodiment may be implemented using the same circuit topology, embodiments are also possible and contemplated wherein the respective phases implement different circuit topologies with respect to one another. It is further noted that while power converter 815 is a two-phase converter, the number of phases may be greater than two. Furthermore, embodiment utilizing other techniques, such as coupled inductors (where two different inductor coils share the same magnetic core) are possible and contemplated.

The functional circuit blocks in the embodiment shown may be virtually any type of analog, digital, or mixed-signal circuitry. The power converters shown in FIG. 8 may be chosen based on various characteristics of the load provided by these functional circuit blocks.

Figure 9:
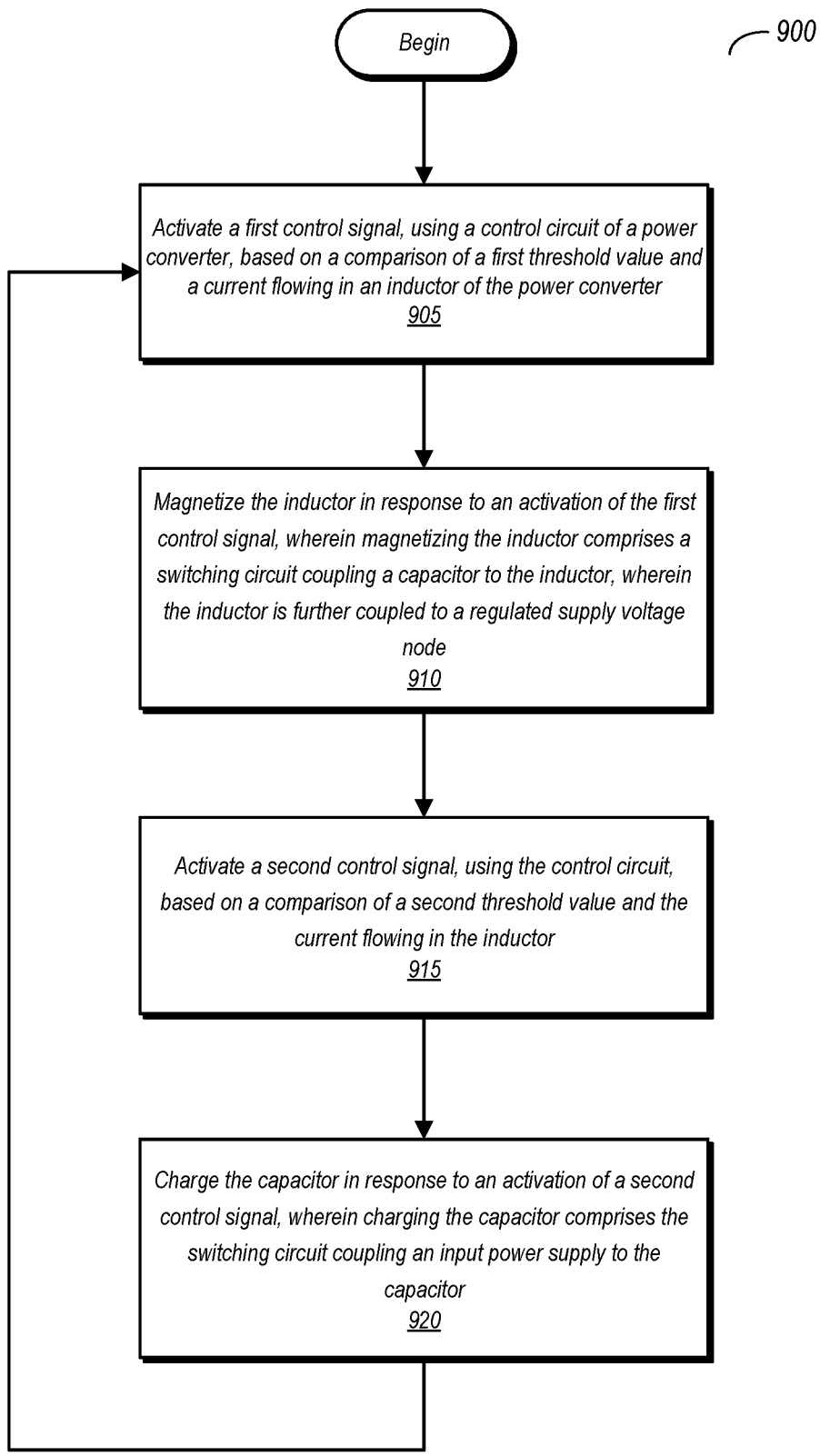
FIG. 9 is a flow diagram illustrating operation of one embodiment of a power converter.

Method of Operating:

FIG. 9 is a flow diagram of one embodiment of a method for operating a power converter. Method 900 may be carried out by any of the various circuit embodiments discussed above with reference to FIGS. 1-8. Embodiments of a power converter not explicitly discussed herein but otherwise capable of carrying out Method 900 may also fall within the scope of this disclosure.

Method 900 includes activating a first control signal, using a control circuit of a power converter, based on a comparison of a first threshold value and a current flowing in an inductor of the power converter (block 905). The method further includes magnetizing the inductor in response to an activation of the first control signal, wherein magnetizing the inductor comprises a switching circuit coupling a capacitor to the inductor, wherein the inductor is further coupled to a regulated supply voltage node (block 910). During a next phase of operation, the method includes activating a second control signal, using the control circuit, based on a comparison of a second threshold value and the current flowing in the inductor (block 915), and charging the capacitor in response to an activation of a second control signal, wherein charging the capacitor comprises the switching circuit coupling an input power supply to the capacitor (block 920).

The method carried out by a power converter of the present disclosure includes providing a regulated supply voltage on the regulated supply voltage node in response to activating the first and second control signals. In some embodiments, the method includes raising a voltage on a first local voltage node, during charging of the capacitor, to a value greater than a value of an input voltage provided by the input voltage supply, wherein magnetizing the inductor comprises discharging the capacitor through the inductor. Such embodiment of the method further includes coupling the input power supply to a second local voltage node by activating a third control signal concurrent with activating the first control signal, wherein the capacitor is coupled between the first and second local voltage nodes and coupling the second local voltage node to the inductor by activating a fourth control signal concurrent with activating the second control signal.

In various embodiments, a power converter includes a bypass path. Accordingly, embodiments of the method may include the control circuit causing the input voltage supply to be coupled to the regulated supply voltage node by activating a bypass signal.

Example System

Figure 10:
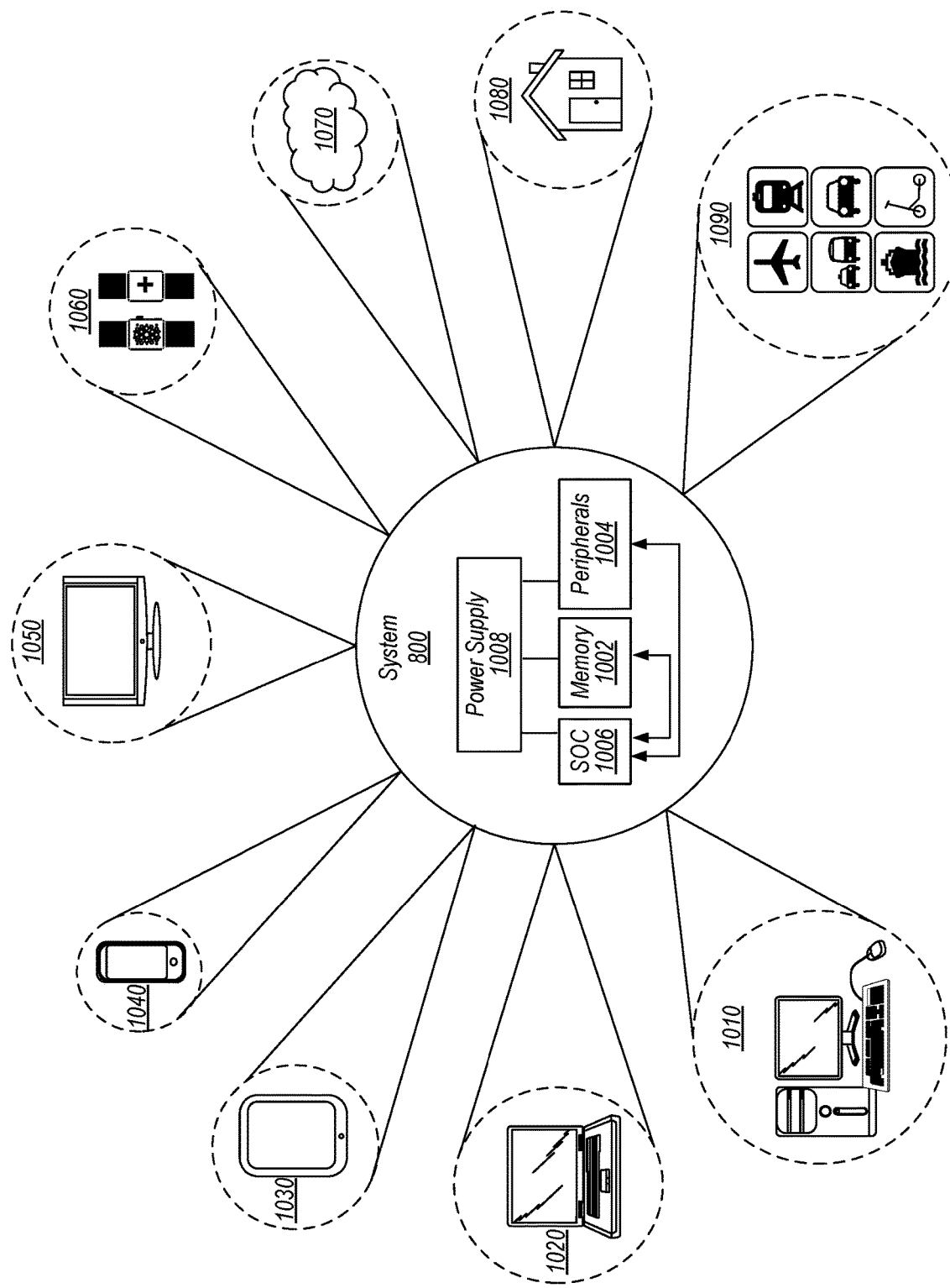
FIG. 10 is a block diagram of one embodiment of an example system.

Turning next to FIG. 10, a block diagram of one embodiment of a system 800 is shown that may incorporate and/or otherwise utilize the methods and mechanisms described herein. In the illustrated embodiment, the system 1000 includes at least one instance of a system on chip (SoC) 1006 which may include multiple types of processing units, such as a central processing unit (CPU), a graphics processing unit (GPU), or otherwise, a communication fabric, and interfaces to memories and input/output devices. In various embodiments, SoC 1006 is coupled to external memory 1002, peripherals 1004, and power supply 1008.

Various embodiments of system 800 may include one or more instances of a power converter as discussed above with reference to FIGS. 1-9. These instances of a power converter may be implemented on, e.g., SoC 1006, one or more integrated circuit implemented in peripherals 1004, and so on.

A power supply 1008 is also provided which supplies the supply voltages to SoC 806 as well as one or more supply voltages to the memory 1002 and/or the peripherals 1004. In various embodiments, power supply 1008 represents a battery (e.g., a rechargeable battery in a smart phone, laptop or tablet computer, or other device). In some embodiments, more than one instance of SoC 1006 is included (and more than one external memory 1002 is included as well).

The memory 1002 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 1004 include any desired circuitry, depending on the type of system 1000. For example, in one embodiment, peripherals 1004 includes devices for various types of wireless communication, such as Wi-Fi, Bluetooth, cellular, global positioning system, etc. In some embodiments, the peripherals 1004 also include additional storage, including RAM storage, solid state storage, or disk storage. The peripherals 1004 include user interface devices such as a display screen, including touch display screens or multitouch display screens, keyboard or other input devices, microphones, speakers, etc.

As illustrated, system 1000 is shown to have application in a wide range of areas. For example, system 1000 may be utilized as part of the chips, circuitry, components, etc., of a desktop computer 1010, laptop computer 1020, tablet computer 1030, cellular or mobile phone 1040, or television 1050 (or set-top box coupled to a television). Also illustrated is a smartwatch and health monitoring device 1060. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 1000 may further be used as part of a cloud-based service(s) 1070. For example, the previously mentioned devices, and/or other devices, may access computing resources in the cloud (i.e., remotely located hardware and/or software resources). Still further, system 1000 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 10 is the application of system 1000 to various modes of transportation. For example, system 1000 may be used in the control and/or entertainment systems of aircraft, trains, buses, cars for hire, private automobiles, waterborne vessels from private boats to cruise liners, scooters (for rent or owned), and so on. In various cases, system 1000 may be used to provide automated guidance (e.g., self-driving vehicles), general systems control, and otherwise. These any many other embodiments are possible and are contemplated. It is noted that the devices and applications illustrated in FIG. 10 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on." The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity, described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A power converter, comprising:
    a switching circuit coupled to a capacitor and to a regulated power supply node via an inductor, wherein the switching circuit is configured to:
        magnetize the inductor using the capacitor in response to an activation of a first control signal; and
        charge the capacitor using an input power supply in response to an activation of a second control signal; and
    a control circuit configured to cause the power converter to operate as a boost converter in a first mode and as a buck converter in a second mode, wherein, during operation in the first mode, the control circuit is configured to:
        activate the first control signal and deactivate the second control signal based on a comparison of a first threshold value and a current flowing in the inductor; and
        activate the second control signal and deactivate the first control signal based on a comparison of a second threshold value and the current flowing in the inductor; and
    wherein the control circuit is further configured to:
        during operation in the second mode, the control circuit is configured to alternately activate and deactivate the first control signal while maintaining the second control signal as active; and
        implement a short-to-ground protection function by activating the first and second control signals.

2. The power converter of claim 1, further comprising a bypass circuit configured to couple the regulated power supply node to the input power supply in response to activation of a bypass signal.

3. The power converter of claim 1, wherein the control circuit is configured to:
    cause a first switch of the switching circuit to couple the inductor to a first local voltage node by activating the first control signal; and
    cause a second switch of the switching circuit to couple the input power supply to the first local voltage node by activating the second control signal.

4. The power converter of claim 3, wherein the capacitor is coupled between the first local voltage node and a second local voltage node.

5. The power converter of claim 3, wherein the control circuit is further configured to:
    cause a third switch of the switching circuit to couple the input power supply to a second local voltage node by activating a third control signal concurrent with activating the first control signal; and
    cause a fourth switch of the switching circuit to couple the second local voltage node to the inductor by activating a fourth control signal concurrent with activating the second control signal.

6. The power converter of claim 5, wherein the control circuit is further configured to cause a fifth switch to couple the second local voltage node to a ground node by activating a fifth control signal concurrent with activating the second control signal.

7. The power converter of claim 1, wherein the first threshold value is a minimum threshold value, and wherein the control circuit is configured to activate the first control signal in response to the current flowing in the inductor reaching the minimum threshold value.

8. The power converter of claim 1, wherein the second threshold value is a maximum threshold value, and wherein the control circuit is configured to, during operation in the first mode, activate the second control signal in response to the current flowing in the inductor reaching the maximum threshold value.

9. The power converter of claim 1, wherein the control circuit is further configured to, during operation in the first mode:
    electrically couple the input power supply to a first terminal of the capacitor and a ground node to a second terminal of the capacitor during a charging phase; and
    electrically coupled the input power supply to the second terminal of the capacitor and the inductor to the first terminal of the capacitor to magnetize the inductor.

10. A method comprising:
    operating a power converter in a boost mode, wherein operating in the boost mode comprises:
        activating a first control signal, using a control circuit of a power converter, based on a comparison of a first threshold value and a current flowing in an inductor of the power converter;
        magnetizing the inductor in response to an activation of the first control signal, wherein magnetizing the inductor comprises a switching circuit coupling a capacitor to the inductor, wherein the inductor is further coupled to a regulated supply voltage node;
        activating a second control signal, using the control circuit, based on a comparison of a second threshold value and the current flowing in the inductor; and
        charging the capacitor in response to an activation of the second control signal, wherein charging the capacitor comprises the switching circuit coupling an input power supply to the capacitor;
    operating the power converter in a buck mode, wherein operating in the buck mode comprises alternately activating and deactivating the first control signal while maintaining the second control signal as active; and
    implementing a short-to-ground protection function by activating the first and second control signals.

11. The method of claim 10, further comprising providing a regulated supply voltage on the regulated supply voltage node in response to activating the first and second control signals.

12. The method of claim 10, further comprising:
    raising a voltage on a first local voltage node, during charging of the capacitor, to a value greater than a value of an input voltage provided by an input voltage supply;
    wherein magnetizing the inductor comprises discharging the capacitor through the inductor.

13. The method of claim 12, further comprising:
    coupling the input power supply to a second local voltage node by activating a third control signal concurrent with activating the first control signal, wherein the capacitor is coupled between the first and second local voltage nodes; and coupling the second local voltage node to the inductor by activating a fourth control signal concurrent with activating the second control signal.

14. The method of claim 10, further comprising the control circuit causing an input voltage supply to be coupled to the regulated supply voltage node by activating a bypass signal.

15. A circuit comprising:
an inductor coupled between a switch node and a regulated supply voltage node;
a capacitor coupled between a first local voltage node and a second local voltage node;
a switching circuit having a plurality of switches including a first switch coupled between the first local voltage node and the switch node, and a second switch coupled between the first local voltage node and an input voltage node; and
a control circuit configured to, during operation in a boost converter mode:
cause the inductor to be magnetized by activating the first switch using a first control signal, concurrent with deactivating the second switch using a second control signal; and
cause the capacitor to be charged by activating the second switch using the second control signal concurrent with de-activating the first switch using the first control signal;
wherein the control circuit is further configured to:
during operation in a buck converter mode, alternately activate and deactivate the first switch using the first control signal while maintaining the second switch as active using the second control signal; and
implement a short-to-ground protection function by activating the first and second control signals.

16. The circuit of claim 15, wherein the control circuit is further configured to, during operation in the boost converter mode:
cause the input voltage node to be coupled to the second local voltage node by activating a third switch using a third control signal; and
cause the second local voltage node to be coupled to the inductor by activating a fourth switch using a fourth control signal.

17. The circuit of claim 16, wherein the control circuit is configured to, during operation in the boost mode, cause the first switch and the third switch to be activated concurrently, and further configured to cause the second switch and the fourth switch to be activated concurrently.

18. The circuit of claim 15, wherein the control circuit is configured to cause the capacitor to be charged such that a voltage on the first local voltage node is raised to a value greater than a value of an input voltage received on the input voltage node.

19. The circuit of claim 15, further comprising a bypass switch coupled between the input voltage node and the regulated supply voltage node, wherein the control circuit is configured to activate the bypass switch using a bypass control signal.

20. The circuit of claim 15, wherein the control circuit is configured to, during operation in the boost converter mode, cause activation of the first switch in response to a current through the inductor reaching a minimum threshold value and cause activation of the second switch in response to the current through the inductor reaching a maximum threshold value.

* * * * *